March 29, 1932. J. BOGOPOLSKY 1,851,800
SEMIAUTOMATIC APPARATUS FOR CUTTING, PREPARING,
AND STICKING CINEMATOGRAPHIC FILMS
Filed March 27, 1928 3 Sheets-Sheet 1

INVENTOR.
Jacques Bogopolsky

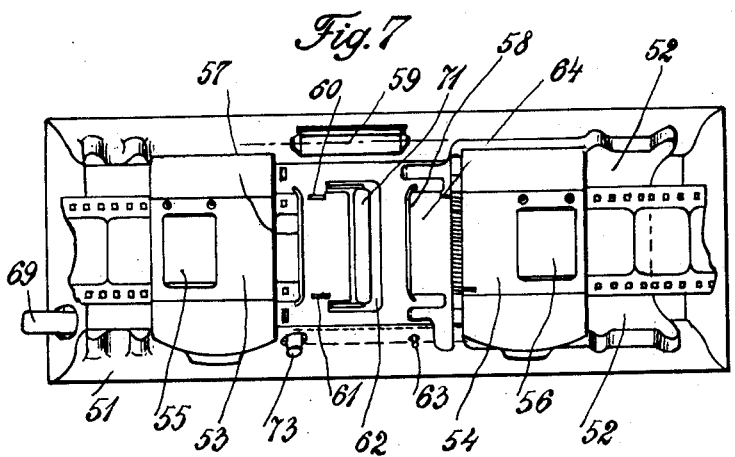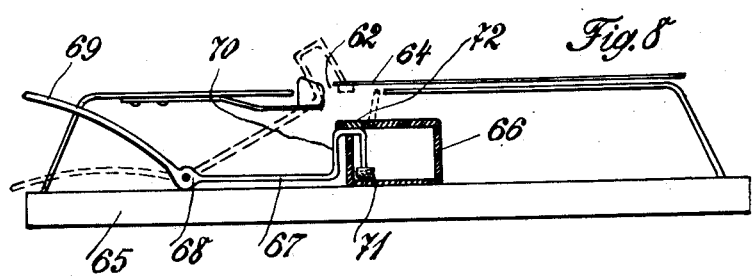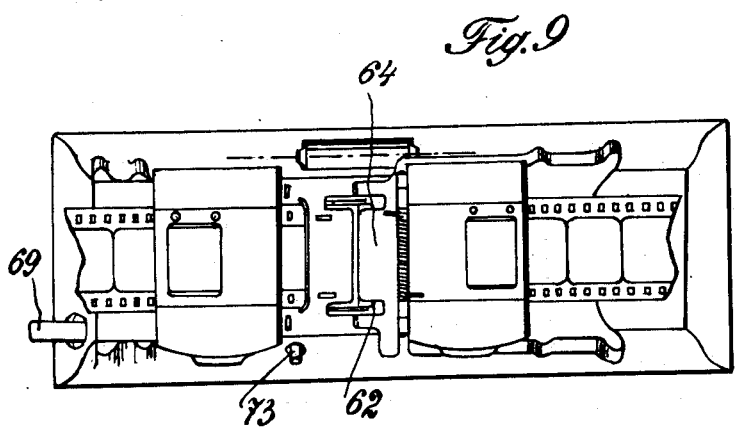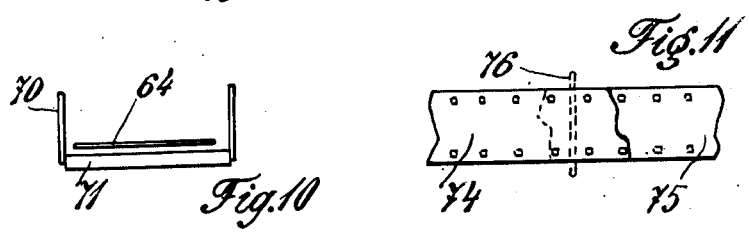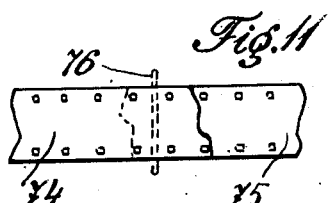

Patented Mar. 29, 1932

1,851,800

UNITED STATES PATENT OFFICE

JACQUES BOGOPOLSKY, OF ACACIAS-GENEVA, SWITZERLAND

SEMIAUTOMATIC APPARATUS FOR CUTTING, PREPARING AND STICKING CINEMATOGRAPHIC FILMS

Application filed March 27, 1928, Serial No. 265,144, and in Switzerland April 1, 1927.

The object of the present invention is a semi-automatic apparatus for cutting, preparing and sticking cinematographic films and other similar objects characterized by the fact that it comprises at least two members each supporting one of the parts to be glued, a variable space being provided between the said parts permitting of the simultaneous cutting and correct cutting of the two ends with evacuation of the waste pieces, the respective positions of the said members being such as to permit, after having cut the two extremities of the film, to bring them suitably close together for the gluing, said bringing together being rendered possible by the movement of at least one of said parts, all the successive operations after the first until the last taking place without any displacement of the ends of the films to be glued in relation to the apparatus and to the parts carrying the film.

The accompanying drawings show by way of example a constructional form of the object of the invention.

Figs. 7-9 show again a modified form of embodiment,

Fig. 10 shows a detail of Figs. 7, 8 and 9,

Fig. 11 shows a modified detail of Figs. 3-6.

Figure 1:
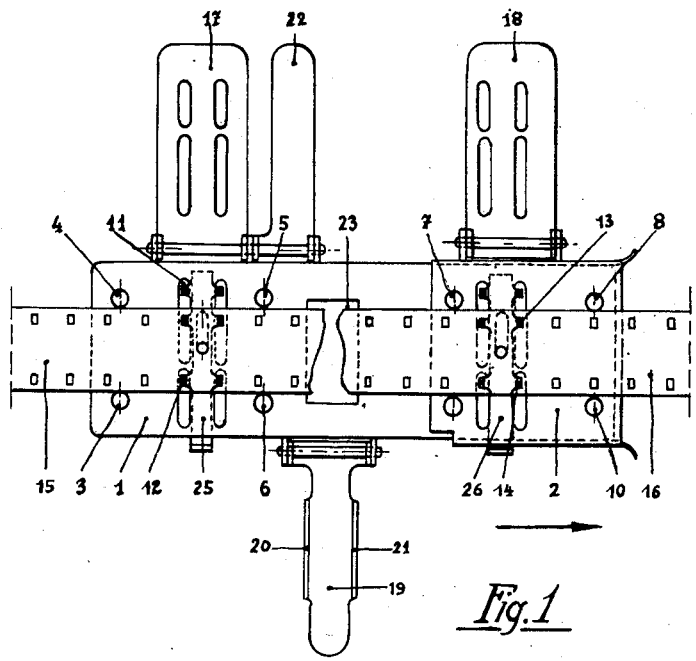
Figs. 1 and 2 show the apparatus in plan view.
Figure 2:
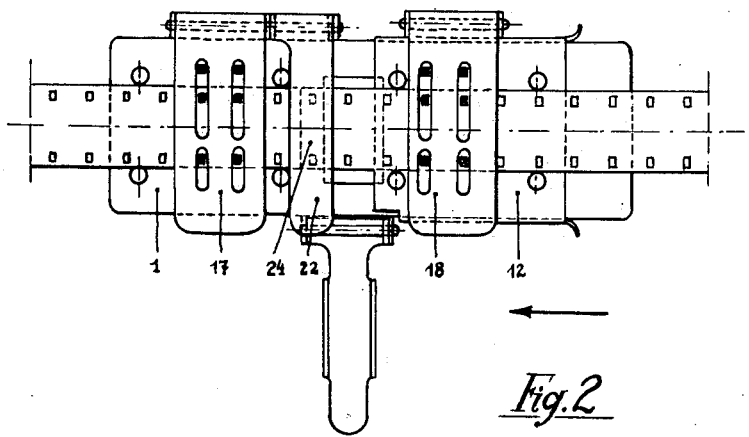
Figure 3:
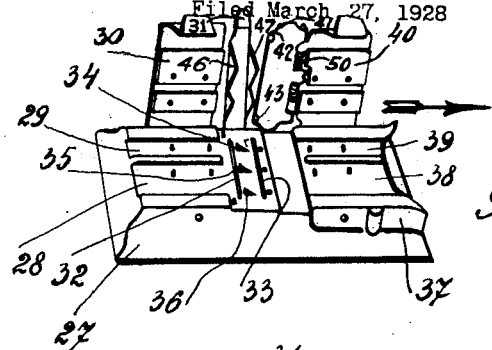
Figs. 3-6 show perspective views of another apparatus.

The gluing apparatus consists of a plate 1 having a slide 2, each of these parts having film guides, 3, 4, 5, 6, 7, 8, 9 etc. as well as teeth 11, 12, 13, 14 etc. The two ends 15 and 16 of the film are placed in their housing, formed by the guides and the teeth and maintained in place by clamping jaws 17 and 18. The knife 19 having two edges 20 and 21 is lowered and simultaneously cuts the two ends of the film. During this first operation the slide 2 will have its position at the extreme right, indicated by the arrow in Fig. 1. The cutting done the fragments fall into a hole 23 and the knife is returned to its initial position. The slide 2 (Fig. 2) is brought close by pushing it towards the left in the direction indicated by the arrow and the ends of the films will be superposed at 24, the travel of the slide 2 being suitably adjusted beforehand and comprising stops not shown. It suffices to glue one of the ends of the film and to close down the presser 22.

In the case where it is desired to prepare one of the ends of the film beforehand, that is to say remove the gelatine, the parts 17 will serve as a rule, limiting the zone of film to be treated. A scraper which is not shown may be carried by the same claw 17 to facilitate the operation. Nevertheless, this treatment is not necessary if a suitable glue is utilized.

The slide 2 comprising stops not shown, each time occupies the two extreme positions which automatically ensures the correct cutting of the two films and their superposing at the position for gluing. This slide can have extensions which are not shown, to prevent the operation of the knife 19 and the presser 22 in the case where it is not in the correct position at the moment of cutting or gluing and which will avoid any false operation.

The same gluing apparatus can serve for the gluing of different kinds of film having different perforations and widths. The teeth 12 of the plate 1 and the teeth 14 of the slide 2 are fixed. Said plate and slide are respectively provided with slides 25, 26 which are shiftable transversely thereof and are respectively provided with teeth 11, 13. Additionally said slides 25, 26 are provided with teeth $11^a$, $13^a$. Each of said slides 25, 26 is provided with a slot as indicated in dotted lines in Figure 1 and stop pins extend through said slots. Where the film has perforations near its side edges, as is usual, the slides 25, 26 are appropriately adjusted, according to the width of the film, to cause the teeth 12, 14 and 11, 13 to engage in the perforations of the film. For wide films, the said slides 25, 26 may be so adjusted as to cause the teeth $11^a$, $13^a$ to engage in their perforations of one side, instead of the teeth 11, 13. In the case of a film which has perforations in the center, the slides 25, 26 may be so adjusted as to arrange the teeth 11, 13 in the required position to engage in their perforations. It will be noted that the elements 17, 18, 22 are provided with slots to clear the teeth.

Figure 4:
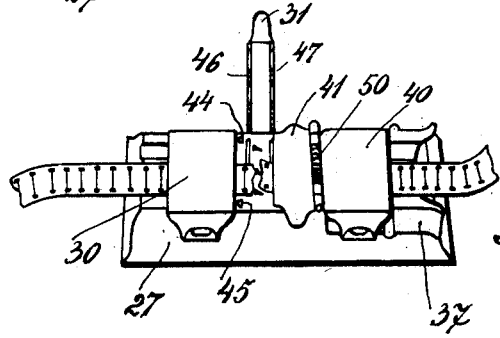
Figure 5:
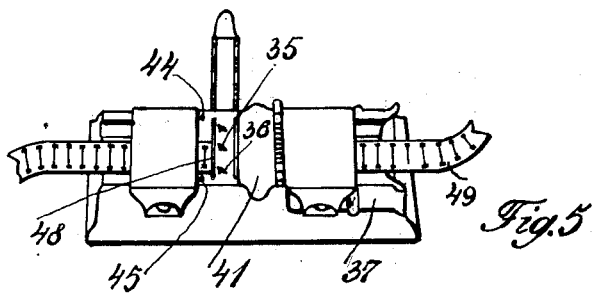
Figure 6:
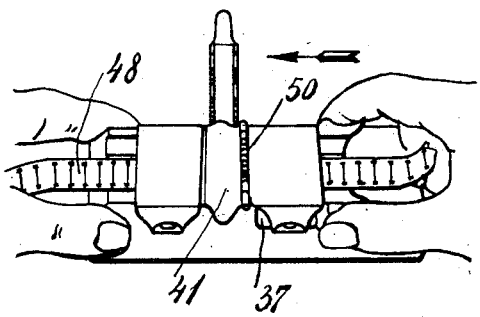

Figs. 3-6 represent a second form of embodiment of the invention. The base 27 (Fig. 3) has two housing grooves 28 and 29 in line with identical housing grooves 38, 39, of the slide 37, which is slidable on the base. A clamping jaw 30 and a knife 31 are provided. The base has two truncated slots 32, 33 and three spring acted projections 34, 35, 36 arranged therebetween. The slide 37 also has a clamping jaw 40, to which is articulated a pressure-plate 41, provided with a spring 50 and two projections 42, 43, which engage into the apertures 44, 45 at a given moment (Fig. 4). The grooves 28, 29 are of different widths provided for films of different widths. Fig. 4 shows the apparatus with a large film. maintained by the clamping jaws 30 and 40. The knife 31 (Fig. 3) comprises two edges of a saw-like form, in order to facilitate the cutting operation from the mid-line and prevent the lateral displacement of the film. These edges 46, 47 engage into the slots 32, 33, and hence have the advantage of imparting to the cutting a proper form without necessitating an adjustment or resharpening of the edges. The end 48 of the film (Fig. 5) is then provided with glue and the slide 37 pushed in the direction of the arrow (Fig. 6). The end of the film 49 is raised by the elastic or spring acted projections 35, 36 and passes over the end 48 of the film (Fig. 5). The jaw 41 is maintained in its raised position by the projections 42, 43 (Fig. 3) which lay on the borders of the plate, but arrive at the end of the stroke, these projections enter into the openings 44, 45 (Fig. 5); owing to the effect of the spring 50 the pressure-plate 41 the two film ends are conveniently pressed on another. As the spring 50 is stronger than the springs of the projections 35, 36, the lever will escape and do not hinder the film.

Figs. 7-10 show a third form of execution of the invention, which differs from the latter by the fact, that the apparatus is constructed for larger professional films and comprises a semi-automatic gluing device for the film.

The plate 51 is provided with a slide 52 which has plates 53, 54 with openings 55, 56 wherein appear the pictures of the film, in order to show the correct charging of the apparatus, in view of the fact that the film comprises a plurality (4) of perforations per picture. The ends of the cutting slots 57, 58 are bent inwardly, and also those of the knives, so that the edges of the film will be broken away. The two projections 60, 61 serve to raise the end of the film lying within the slide 52 sufficiently to facilitate its being overlapped on the other end of the film. After the cutting of the film, the slide is pushed to the left hand, but is arrested on the half-way by a pin 63 against which it strikes. At this moment, as it is shown in Fig. 9, the end of the film lying in the housing of the slide, and lodged below the pressure-plate arrives above the opening or slot 62, cut out in the upper plate of the socket. Below this slot 62 and on the plate 65 (Fig. 8) is placed a font 66 containing the glue, and closed by a spring actuated cover 72. 67 is a crank-lever oscillating on a journal 68 and having a handle 69 which permits manual operation of the lever from the exterior. By a pressure on the handle 69, the end 70 is raised and grasps the film 74 from below (Fig. 8) so that the dauber 71 is raised from the glue in the font 66 and applies a small quantity of this glue to the film end, as will be understood. The cover 72 of the font 66 is opened by the lever 70, against the tension of its spring. When said lever is lowered, the operator presses on the button 73 (Fig. 9) attached to a spring, shown in Fig. 7 in dotted lines, to which spring is also fixed the above mentioned stop pin 63. The pin is therefore moved out of the path of the slide 52 and the latter can again be moved to the left hand, to cause the two film ends, to be arranged in overlapping position, and can be glued by the pressure-plate 64, as described. The two slots may be replaced by one only, as indicated at 76 in Fig. 11. The two ends of the films 74, 75 are superposed as above at 76.

I claim:

1. In apparatus for mending and cutting photographic films, a base having film guide members, a slide movable longitudinally on the base and also having film guide members, and members arranged and adjustable transversely of the base and slide and provided with means to engage films of various widths.

2. Apparatus for mending and cutting photographic films comprising a base having film guide members, a slide movable longitudinally on the base and also having film guide members, yieldable lugs on the base projected normally above the same, a clamping jaw pivotally connected to one side of the base, a clamping jaw carried by and pivotally connected to one side of the slide, a plate hingedly connected to the side of the last named jaw nearest the first named jaw, and a spring active to press a film against the base when the second named jaw is in closed position and of such strength as to countervail the said yieldable lugs.

3. In apparatus for mending and cutting photographic films, a base having film guide members and transverse slots, and a knife having substantially equilateral triangular teeth on opposite sides to enter the said slots, said teeth preventing sidewise moving of a film when in process of cutting thereby.

4. In apparatus for mending photographic films a base having film guide members, a slide movable longitudinally on the base and also having film guide members, said base and said slide each having a clamp arm to bear on the upper side of the film, a spring supported member to bear upwardly against the underside of the film, a glue font in the base, and a glue dauber having an operating arm pivotally mounted on the base whereby said glue dauber may be moved between the font and the film to apply glue to the lower side of the latter.

5. Apparatus as claimed in claim 4, including a hinged cover for the font movable to open position by a glue-applying movement of the dauber.

In testimony whereof I have hereunto set my hand this 2nd day of November, A. D. 1927.

JACQUES BOGOPOLSKY.